United States Patent
Jamieson et al.

(10) Patent No.: US 10,706,298 B2
(45) Date of Patent: Jul. 7, 2020

(54) METHOD TO AUTOMATE DETECTION OF VEHICLE LAMP DEGRADATION

(71) Applicant: GM GLOBAL TECHNOLOGY OPERATIONS LLC, Detroit, MI (US)

(72) Inventors: Tyler J. Jamieson, North York (CA); Hossein Sadjadi, Markham (CA); Arash Mohtat, North York (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 16/106,351

(22) Filed: Aug. 21, 2018

(65) Prior Publication Data
US 2020/0065593 A1 Feb. 27, 2020

(51) Int. Cl.
*G06T 7/00* (2017.01)
*G06K 9/00* (2006.01)
*B60Q 1/14* (2006.01)
*G06K 9/20* (2006.01)

(52) U.S. Cl.
CPC ....... *G06K 9/00825* (2013.01); *B60Q 1/1423* (2013.01); *G06K 9/2027* (2013.01)

(58) Field of Classification Search
CPC .. G06K 9/00825; G06K 9/00818; G06K 9/52; G06K 9/685; G06T 2207/10016; G06T 2207/30252; G06T 2207/30236; G06T 7/90; G06T 7/0004; G06T 7/0012
See application file for complete search history.

(56) References Cited

U.S. PATENT DOCUMENTS

| 5,157,376 A * | 10/1992 | Dietz | B60Q 11/007 307/10.8 |
| 2004/0056779 A1* | 3/2004 | Rast | B63B 22/16 340/985 |
| 2004/0218401 A1* | 11/2004 | Okubo | B60Q 1/085 362/526 |
| 2012/0007505 A1* | 1/2012 | Hayashi | F21S 41/155 315/77 |
| 2014/0232265 A1* | 8/2014 | Masuda | B60Q 1/1423 315/82 |
| 2014/0314279 A1* | 10/2014 | Zhang | G06K 9/00798 382/104 |
| 2015/0239436 A1* | 8/2015 | Kanai | B60T 7/08 701/23 |
| 2016/0039331 A1* | 2/2016 | Hiratsuka | B60Q 1/085 701/49 |

(Continued)

FOREIGN PATENT DOCUMENTS

| DE | 19852351 A1 | 5/2000 |
| DE | 102013110840 A1 | 4/2015 |

(Continued)

*Primary Examiner* — Jingge Wu

(57) ABSTRACT

A method to automate detection of a vehicle light degradation or failure includes generating a distinct pattern to be executed by at least one vehicle light, and sending a command to a light control module operative to cause the at least one vehicle light to emit the distinct pattern. The method continues with extracting features from camera images of the distinct pattern emitted by the at least one vehicle light, and then comparing the features extracted from the camera images with features from the commanded distinct pattern to determine degradation or failure of the at least one vehicle light's state of health.

20 Claims, 2 Drawing Sheets

(56) References Cited

U.S. PATENT DOCUMENTS

| | | | | |
|---|---|---|---|---|
| 2017/0072854 A1* | 3/2017 | Cornelius | ............ | B60Q 11/005 |
| 2017/0158130 A1* | 6/2017 | Patil | .................... | B60Q 11/005 |
| 2017/0171952 A1* | 6/2017 | Troutman | ............ | B60Q 11/005 |
| 2017/0259729 A1* | 9/2017 | Balasundrum | ....... | G07C 5/0808 |
| 2019/0384292 A1* | 12/2019 | Aragon | ................ | G05D 1/0055 |

FOREIGN PATENT DOCUMENTS

| | | |
|---|---|---|
| DE | 102014015796 A1 | 4/2016 |
| DE | 102015214332 A1 | 2/2017 |

* cited by examiner

METHOD TO AUTOMATE DETECTION OF VEHICLE LAMP DEGRADATION

FIELD

Apparatuses and methods consistent with exemplary embodiments relate to methods to detect vehicle light degradation or failure. More particularly, apparatuses and methods consistent with an exemplary embodiment relate to a method to automate detection of a vehicle light degradation or failure.

BACKGROUND

Parking lights, side markers, daytime running lights, and tail lights show the vehicle's presence, position, size, and direction of travel. Reflectors make a vehicle with switched off or failed lights safely visible after dark. This is in contrast to the vehicle's forward illumination lights which light the driver's way forward at night or make driving safer during the day.

Multifunction combination lights may contain a mix of forward illumination lights, signal lights, and reflectors. Validating a vehicle's lights means checking that all required ones are present, that all are in good condition, and that all function correctly. Basically, all lights and reflectors installed on the vehicle must function, even optional ones.

Current methods for validating external vehicle lighting include limited internal circuit diagnostics and/or manual inspection when the vehicle is not being driven. Hence, there is a desire to have a method of automatically detecting the degradation or failure of external vehicle lights before, during or after vehicle operation independently from existing internal circuit diagnostics.

SUMMARY

One or more exemplary embodiments address the above issue by providing a method to automate detection of a vehicle light failure or degradation.

According to aspects of an exemplary embodiment, a method to automate detection of a vehicle light degradation or failure includes generating a distinct pattern to be emitted by at least one vehicle light and sending a command corresponding to the distinct pattern to a light control module operative to cause the at least one vehicle light to emit the distinct pattern. Other aspects as according to the exemplary embodiment include extracting features from camera images of the distinct pattern emitted by the at least one vehicle light, and comparing the features extracted from the camera images with features from the commanded distinct pattern to determine degradation or failure of the at least one vehicle light's state of health.

And a further aspect of the exemplary embodiment includes determining if conditions for testing the state of health of the at least one vehicle light are not optimal. Still a further aspect of the exemplary embodiment includes determining a level of environmental luminescence. And other aspects include using at least one light detecting sensor for determining the level of environmental luminescence, and wherein the at least one light detecting sensor is a camera. And yet other aspects of the method include generating a pattern of combined high beam, low beam, day running beam, and dimmer beam light signals in a distinct pattern, and generating the distinct pattern that is detectable in the camera images.

Further, in accordance with aspects of the exemplary embodiment, the method includes sending an alert message to a vehicle operator when a determination of degradation or failure of the at least one vehicle light's state of health is made, and storing at least one diagnostic trouble code in vehicle memory when a determination of degradation or failure of the at least one vehicle light's state of health is made. And another aspect wherein the method is operative to automatically detect degradation or failure of the at least one vehicle light before, during, or after vehicle operation. Yet one other aspect wherein the method is operative to execute automatically on a predetermined periodic basis.

BRIEF DESCRIPTION OF THE DRAWINGS

The present exemplary embodiment will be better understood from the description as set forth hereinafter, with reference to the accompanying drawings, in which.

DETAILED DESCRIPTION OF THE INVENTION

Figure 1:
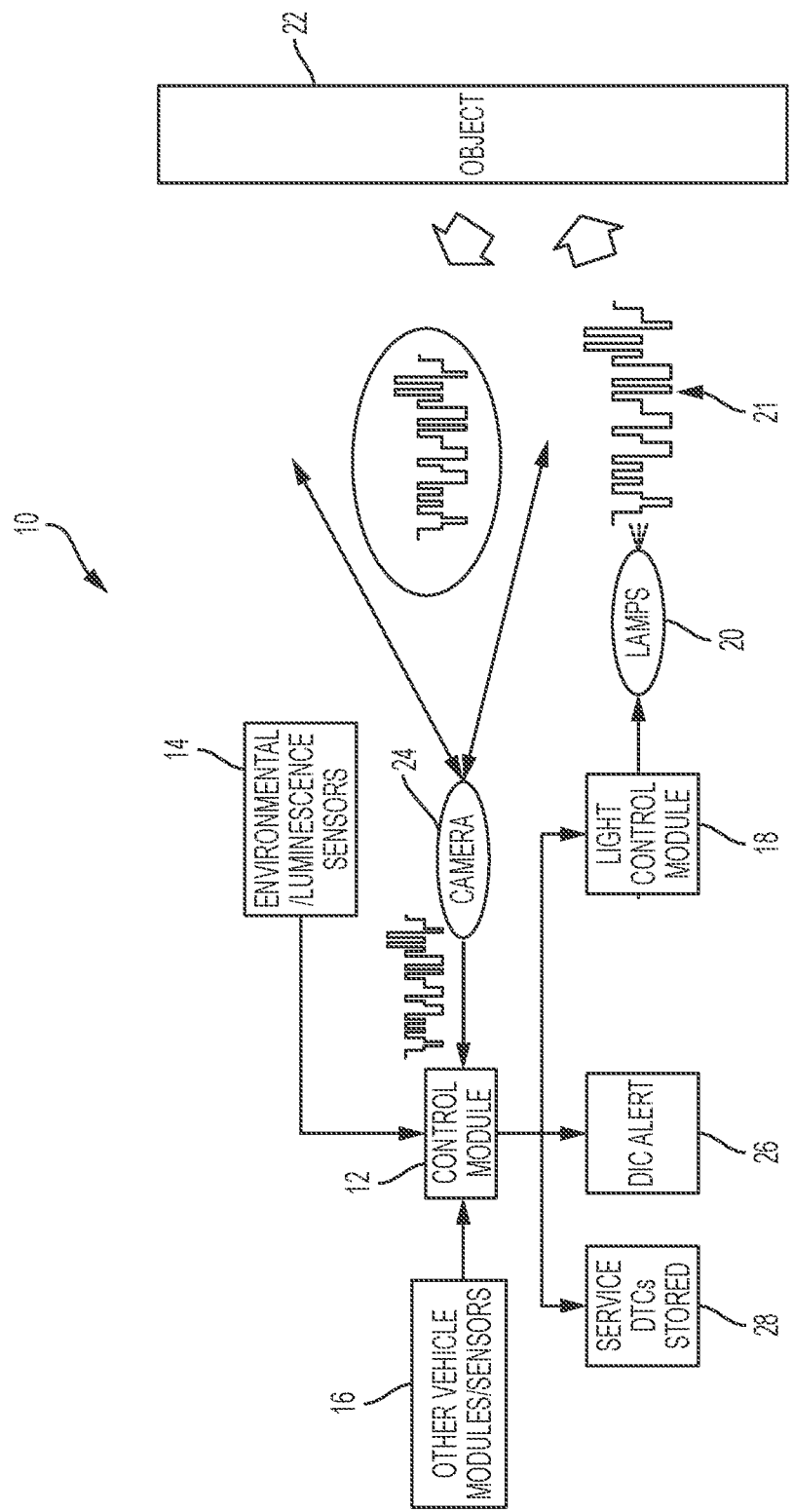
FIG. 1 is an illustration of a block diagram of a system for facilitating a method to automate detection of a vehicle light failure or degradation in accordance with an exemplary embodiment.

The following description is merely exemplary in nature and is not intended to limit the present disclosure, application, or uses thereof.

FIG. provides a block diagram of a system 10 for facilitating a method to automate detection of a vehicle light degradation or failure in accordance with an exemplary embodiment. The system 10 includes a control module 12 in communication with at least one light detecting sensor (14, 16) which include, but not limited to, a luminescence/light sensor, a vehicle speed sensor, a photo sensor, a photo resistor, a camera, and a transmission control module (TCM). The various light detecting sensors and control module(s) (14, 16) are used to determine the level of environmental luminescence and an optimal time of the day to perform the method to automate detection of a vehicle light degradation or failure. For example, an optimal time for conducting the method in accordance with an exemplary embodiment would be when the vehicle is in a low light environment such as outside before dawn, outside after dusk, or when the vehicle is parked in a garage or some other dimly light structure. Conversely, it may not be an optimal time to perform the method outside on bright sunny days or when the vehicle is travelling at high speeds and facing oncoming traffic. Thus, the sensors and vehicle module(s) (14, 16) are used to determine the optimal time for when the method can be performed.

The system 10 also includes a light control module 18 in communication with the control module 12. It is appreciated that the light control module 18 may be a stand-alone module as shown or presented as a subsystem integrated within the control module 12. The light control module 18 is operative to command the vehicle lights 20 to switch between various modes such as high beam mode, low beam mode, day running mode, emergency mode, etc. . . . . After receiving inputs signals from the sensors and vehicle module(s) (14, 16), the control module 12 determines if it is an optimal time to perform the method. If so then the control module 12 will generate a distinct pattern before sending a command corresponding to the distinct pattern to the light control module 18. The light control module 18 receives the command from the control module 12 and causes at least one of the vehicle lamps 20 to emit the distinct pattern 21.

The distinct pattern 21 is a pattern of combined high beam, low beam, day running beam, dimmer beam light signals, or other lighting functions in a distinct pattern. The distinct pattern 21 is preferably directed toward an object or target 22 that reflects the distinct pattern 21 back toward a camera 24 mounted on the vehicle. The camera 24 is operative to capture and extract features from camera images of the distinct pattern 21 emitted by the at least one vehicle light 20. Then the camera 24 delivers the camera images back to the control module 12 for comparing the features extracted from the camera images with features of the commanded distinct pattern to determine degradation or failure of the at least one vehicle light's state of health. If it is determined that degradation or failure has occurred then the control module 12 will send an alert to the driver information center 26 that the vehicle light(s) 20 needs repair or replacement. Further, the control module 12 will also store at least one at least one diagnostic trouble code or other information that can be accessed by service personnel during a service call. Additionally, the method in accordance with the exemplary embodiment is operative to automatically detect degradation or failure of the at least one vehicle light before, during, or after vehicle operation. The method is also operative to execute automatically on a predetermined periodic basis for determining if degradation or failure of a vehicle exterior light has occurred.

Figure 2:
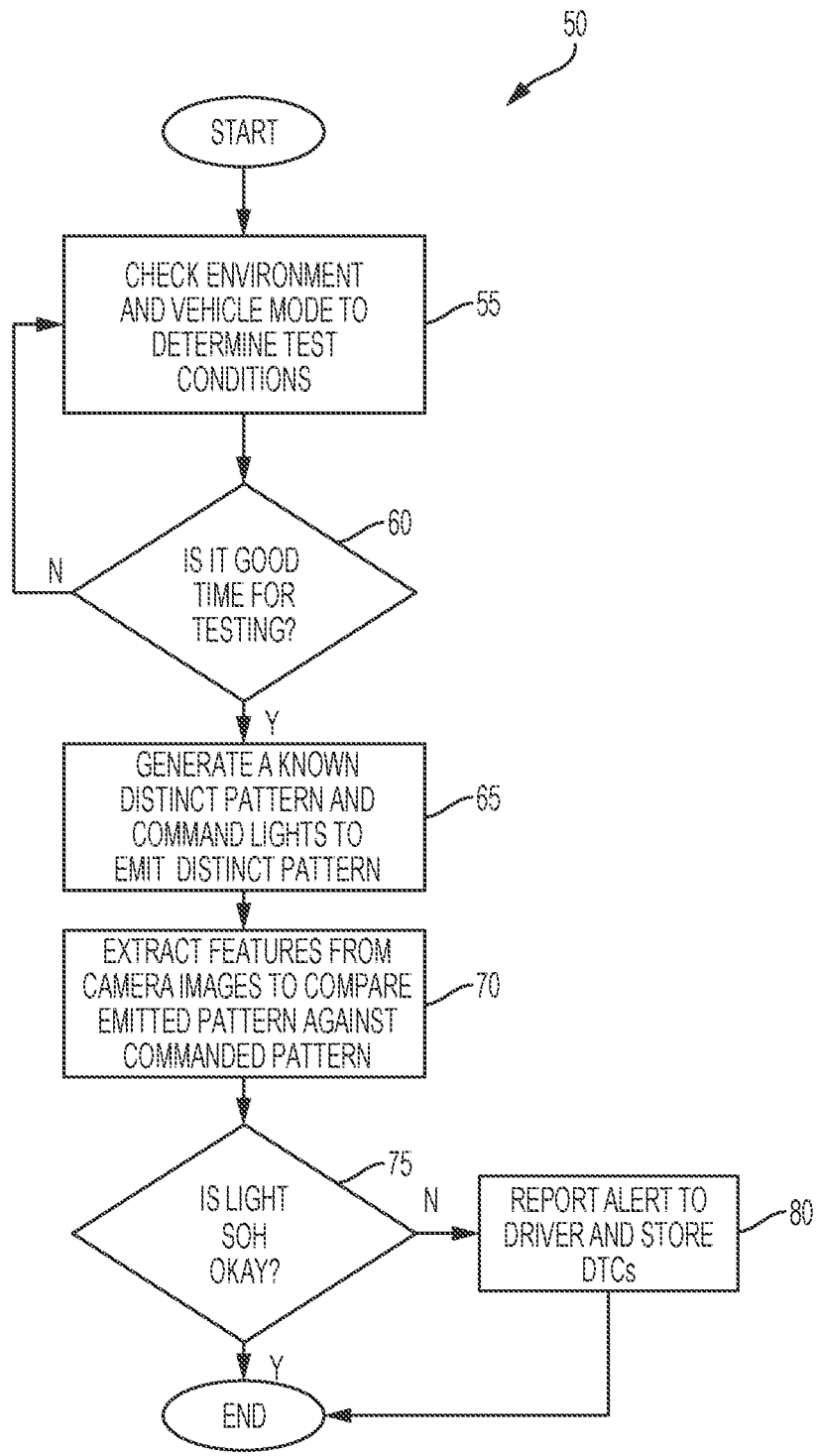
FIG. 2 is an illustration of a flow diagram for the method to automate detection of a vehicle light failure or degradation in accordance with aspects of the exemplary embodiment.

Referring now to FIG. 2, an illustration of a flow diagram 50 for the method to automate detection of a vehicle light failure or degradation in accordance with aspects of the exemplary embodiment is provided. The method begins at block 55 with checking the vehicle's environment and the vehicle's mode to determine if the time for performing the method is optimal. At least one light detecting sensor is used to determine environmental luminescence and the TCM would be used to determine the mode the vehicle is in, e.g., parked or being driven. At block 60, if it is determined that it is a good time to perform the method then the moves to block 65 where the control module 12 generates a distinct pattern and sends a command to the light control module to cause the at least one light to emit the distinct pattern. The distinct pattern emitted by the at least one light will be detected by the camera system disposed on the vehicle.

Next, at block 70, the method continues with extracting features from the captured camera images of the distinct pattern emitted from the at least one light for comparing against the commanded distinct pattern. At block 75, the control module determines if degradation or failure has occurred in the at least one light from differences between the features extracted from the camera images and the commanded distinct pattern. If it is determined that degradation or failure has occurred then, at block 80, the control module causes an alert to be sent to the driver via the driver information center and also stores at least one diagnostic trouble code for retrieval during a service call.

The disclosed method provides a means to detect the degradation or failure of exterior light hardware that can be applied before, during or after vehicle operation independently of existing circuit diagnostics.

The description of the invention is merely exemplary in nature and variations that do not depart from the gist of the invention are intended to be within the scope of the invention. Such variations are not to be regarded as a departure from the spirit and scope of the invention.

What is claimed is:

1. A method to automate detection of a vehicle light degradation or failure comprising:
   generating a distinct pattern to be executed by at least one vehicle light;
   sending a command corresponding to the distinct pattern to a light control module operative to cause the at least one vehicle light to emit the distinct pattern;
   extracting features from camera images of the distinct pattern emitted by the at least one vehicle light; and
   comparing the features extracted from the camera images against features from the commanded distinct pattern to determine degradation or failure of a state of health of the at least one vehicle light.

2. The method of claim 1 further comprises determining if conditions for testing the state of health of the at least one vehicle light are not optimal.

3. The method of claim 2 wherein determining further comprises determining a level of environmental luminescence.

4. The method of claim 3 further comprises using at least one light detecting sensor for determining the level of environmental luminescence.

5. The method of claim 4 wherein the at least one light detecting sensor is a camera.

6. The method of claim 1 wherein generating further comprises generating a pattern of combined high beam, low beam, day running beam, and dimmer beam light signals in the distinct pattern.

7. The method of claim 6 wherein generating further comprises generating the distinct pattern that is detectable in the camera images.

8. The method of claim 1 further comprises sending an alert message to a vehicle operator when a determination of degradation or failure of the at least one vehicle light's state of health is made.

9. The method of claim 1 further comprises storing at least one diagnostic trouble code in vehicle memory when a determination of degradation or failure of the at least one vehicle light's state of health is made.

10. The method of claim 1 operative to automatically detect degradation or failure of the at least one vehicle light before, during, or after vehicle operation.

11. The method of claim 10 operative to execute automatically on a predetermined periodic basis.

12. A method to automate detection of a vehicle light degradation or failure comprising:
    determining if conditions for testing a state of health of an at least one vehicle light are not optimal;
    generating a distinct pattern to be executed by the least one vehicle light;
    sending a command corresponding to the distinct pattern to a light control module operative to cause the at least one vehicle light to emit the distinct pattern;
    extracting features from camera images of the distinct pattern emitted by the at least one vehicle light; and
    comparing the features extracted from the camera images against features from the commanded distinct pattern to determine degradation or failure of the state of health of the at least one vehicle light.

13. The method of claim 12 wherein determining further comprises determining a level of environmental luminescence.

14. The method of claim 13 further comprises using at least one light detecting sensor for determining the level of environmental luminescence.

15. The method of claim 14 wherein the at least one light detecting sensor is a camera.

16. The method of claim 12 wherein generating further comprises generating a pattern of combined high beam, low beam, day running beam, and dimmer beam light signals in a distinct pattern.

17. The method of claim 16 wherein generating further comprises generating the distinct pattern that is detectable in the camera images.

18. The method of claim 12 further comprises sending an alert message to a vehicle operator when a determination of degradation or failure of the at least one vehicle light's state of health is made.

19. The method of claim 12 further comprises storing at least one diagnostic trouble code in vehicle memory when a determination of degradation or failure of the at least one vehicle light's state of health is made.

20. The method of claim 12 being configured to automatically detect degradation or failure of the at least one vehicle light before, during, or after vehicle operation.

* * * * *